Nov. 10, 1964   R. GASQUET ETAL   3,156,255
REMOTE CONTROL INSTALLATIONS FOR A PLURALITY
OF GATE-VALVES WITH COMMON
SOURCE OF OPERATING FLUID
Filed Nov. 2, 1961   3 Sheets-Sheet 2
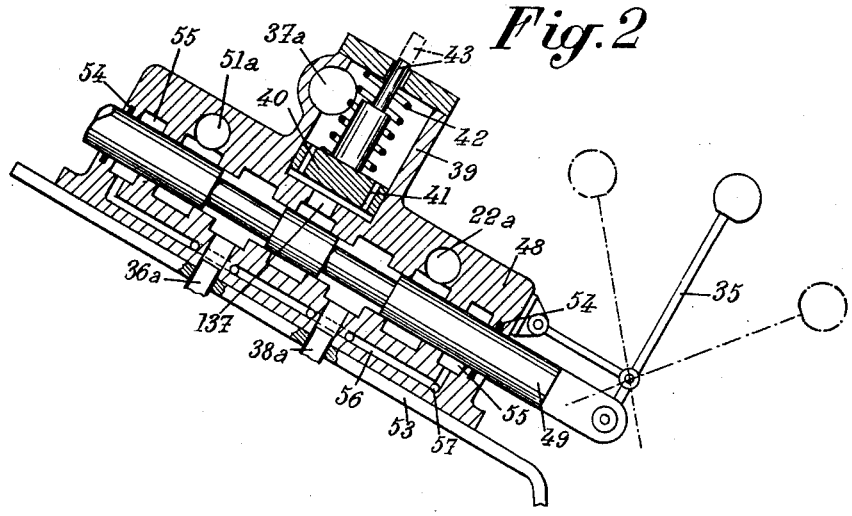
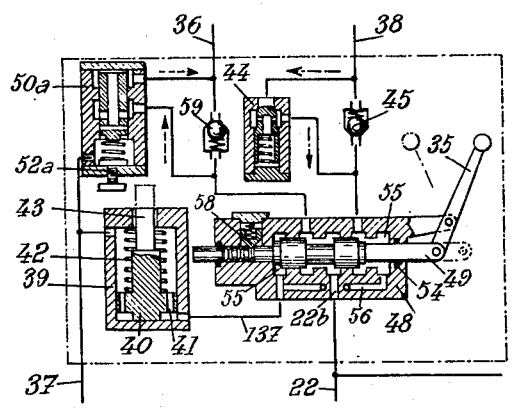
INVENTORS
Rene Gasquet
Gabriel Trichot
BY
Bailey, Stephen & Huettig
ATTORNEYS

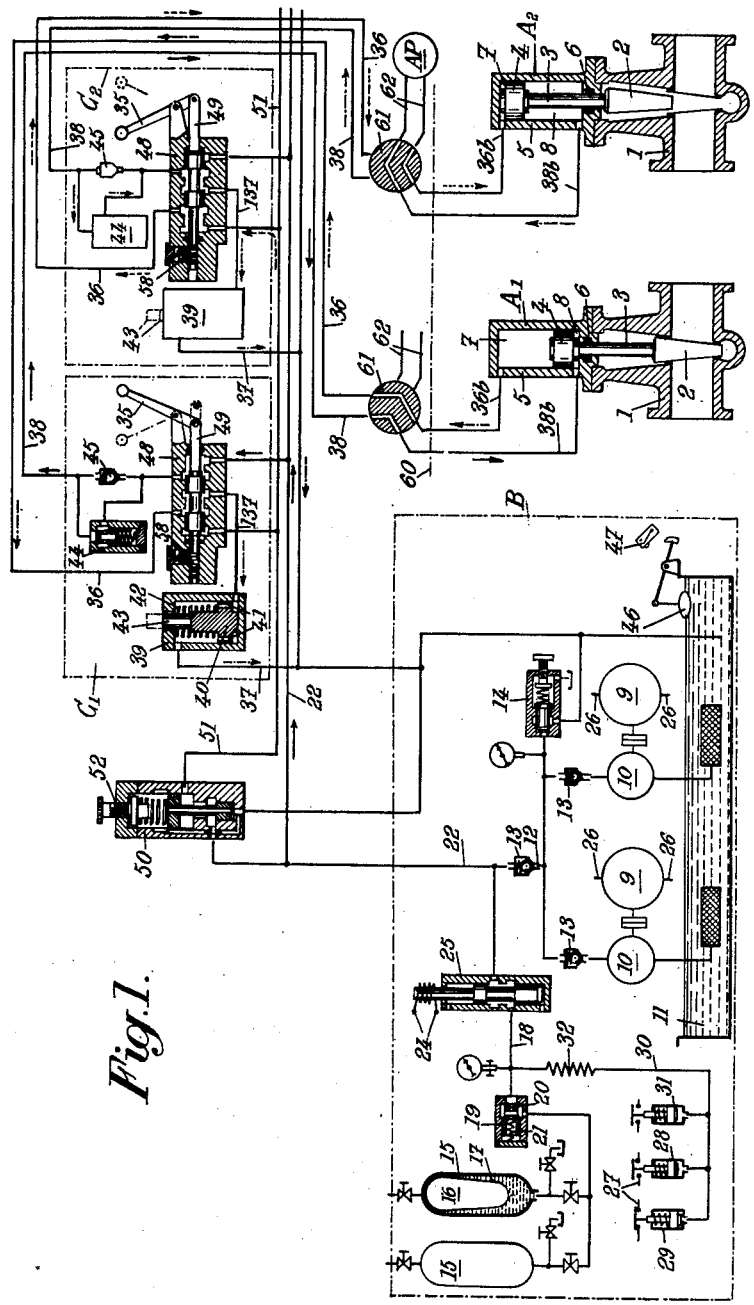

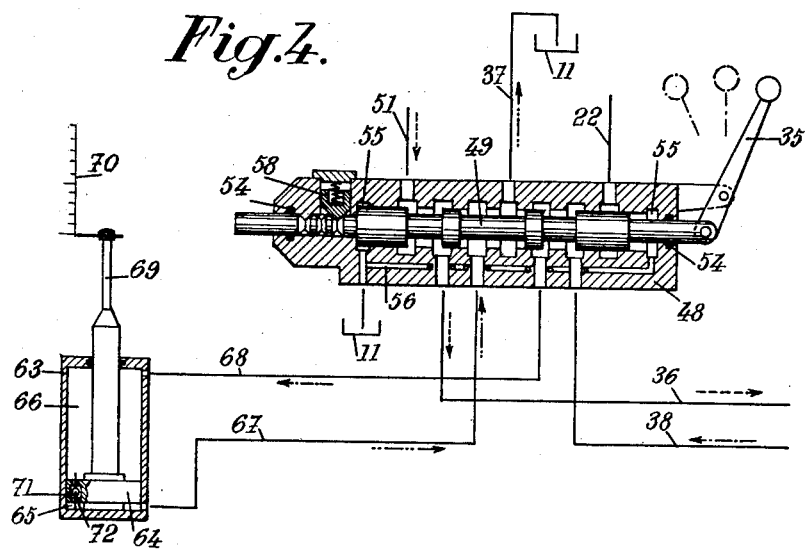
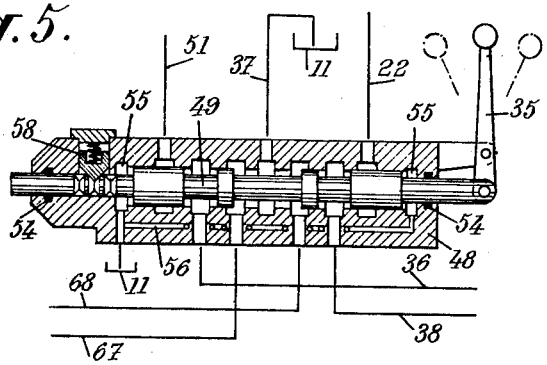
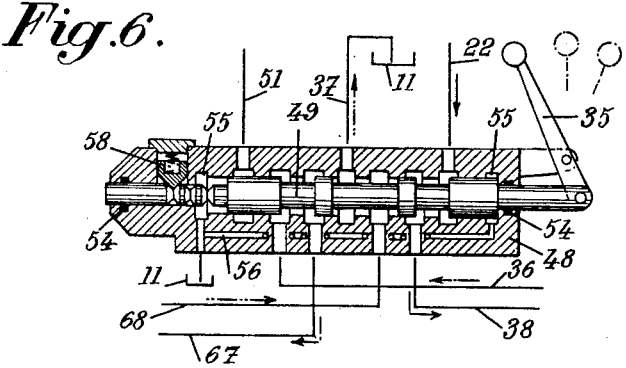

United States Patent Office 3,156,255
Patented Nov. 10, 1964

3,156,255
REMOTE CONTROL INSTALLATIONS FOR A PLURALITY OF GATE-VALVES WITH COMMON SOURCE OF OPERATING FLUID
René Gasquet, Neuilly-sur-Seine, and Gabriel Trichot, Saint-Leu-la-Foret, France, assignors to Societe Industrielle Generale de Mecanique Appliquee S.I.G.M.A., Paris, France, a French body corporate
Filed Nov. 2, 1961, Ser. No. 149,718
Claims priority, application France, Nov. 7, 1960, 843,234
3 Claims. (Cl. 137—344)

The present invention relates to installations which are utilized for the remote control of gate-valves and which are constituted by hydro-mechanical means comprising a common source of liquid under pressure, a double-acting jack arranged in the proximity of each valve and preferably fixed on the body of the valve. The moving member of the jack is mechanically coupled to the gate of the corresponding gate-valve, and a distributor is associated with each jack, the distributors being grouped together in a centralized operating station.

The invention has for its object to improve installations of the kind referred to so that they comply more satisfactorily than at present with the various requirements of practical use.

In order to prevent jamming of the valve gates in their closed position, installations of the kind referred to are characterized, according to the invention, by the fact that they are arranged in such a manner that the operating liquid, supplied to either of the active chambers of the jack from the corresponding distributor, acts at a lower pressure in the chamber which controls the closure of the gate-valve than in the opposite chamber controlling its opening. A pressure-reducing device is preferably interposed for that purpose in the piping system which couples the common source of liquid under pressure to the first of the said chambers, either on the upstream or the downstream side of the said distributor, and in any case in proximity thereto.

In addition, in order to permit the freeing of the gate-valves, there may be provided, on the piping systems coupling each distributor to the jack of the corresponding valve, means enabling the jack to be cut off from the remainder of the installation and for connecting it temporarily to an auxiliary source of liquid under pressure. This means may be a portable pump, preferably with hand operation, capable of developing a pressure higher than the maximum pressure of the common source of liquid under pressure, the said means being preferably placed on the deck in the case of application to ships. Finally, when the distributor is arranged so that it causes the liquid delivered from the chamber of the jack opposite to that which receives the driving liquid under pressure to pass through a flow indicator, there is an advantage in constituting this indicator by a cylinder having a free volume substantially equal to that of the jack and separated by a moving indicator member into two chambers respectively associated with the two chambers of the jack. It is also advantageous to employ a distributor with three positions, namely a neutral position in which it cuts off the two chambers of the jack and connects the two chambers of the indicator to exhaust, and two active positions at which it supplies one of the chambers of the jack, couples the other chamber of the jack to the corresponding chamber of the indicator, and connects the other chamber of said indicator to exhaust.

The invention will be more clearly understood by means of the further description which follows below with reference to the accompanying drawings, the said description and drawings being understood to be given especially by way of indication.

FIG. 1 of the drawings shows diagrammatically, partly in cross-section and partly in elevation, a remote control installation set-up in accordance with the invention, for the cargo gate-valves of a petroleum tanker.

FIG. 2 shows in diagrammatic vertical section the assembly of a distributor and a combined valve-movement indicator, the said distributor and indicator being shown separately in FIG. 1.

FIG. 3 shows an alternative form a detail of FIG. 1.

FIG. 4 shows in cross-section the distributor and the valve-movement indicator of a remote control installation constructed according to a further from of embodiment of the invention.

Finally, FIGS. 5 and 6 show the distributor of FIG. 4 in two other positions of operation.

According to the invention, and more particularly according to that of its methods of application and the forms of construction of its various parts which may be preferred, when constructing an installation for the remote-control of gate-valves such as $A_1$ and $A_2$ (FIG. 1), associated with the tanks of a ship or of a petroleum installation on land, the procedure is as follows.

As far as the whole of the installation is concerned, this is constituted by a hydraulic station B, which supplies oil under pressure, and as many control elements such as $C_1$ and $C_2$ as there are valves, such as $A_1$ and $A_2$ to be controlled, the said control elements being grouped together in a single centralized station.

The gate-valves such as $A_1$ and $A_2$ comprise a body 1 and a gate 2, the latter being rigid with the rod 3 and with the head 4 of the piston of a double-acting jack, the body 5 of which is fixed on the valve body 1, preferably above the latter, so that the gate can move vertically upwards when opening and downwards when closing. A fluid-tight packing 6 separates the jack from the valve. The head 4 divides the cylinder of the jack to form an upper working chamber 7 which controls the closure of the valve and a lower working chamber 8 which controls the opening of the valve.

The station B is constituted by a pumping device and a pressure-accumulator device. The pumping device comprises two motor-pump sets, one in service and the other as a stand-by, connected in parallel, the selection of the set in service being effected by the operator by means of a change-over switch, not shown in the drawings. These two sets, which each comprise an electric motor 9 and a pump 10 with a constant flow-rate, draw in oil from a tank 11 and deliver it into a piping system 12.

The tank is provided with a float 46 which co-operates with a switch 47 inserted in the circuit of a visual and/or sound warning device, the whole being intended to warn the operator of any abnormal fall in the level of liquid in the tank 11. The individual deliveries of the two sets, and also the common piping system 12, are fitted with non-return valves 13. An adjustable calibration valve 14 limits the delivery pressure of the pumping device to a certain value $P_0$ (40 kg./sq. cm. for example).

The pressure-accumulator device comprises a battery of accumulators, each constituted by a container 15 enclosing a variable-volume chamber 16 filled with a gas (nitrogen for example). The spaces such as 17 left free in the interior of each container by the corresponding chamber 16 contain oil, and are connected in parallel to a piping system 18.

In this piping system 18 there is interposed a non-return valve 19 provided with a calibrated orifice 20 and urged by a spring 21 in a direction such that the oil passing out of the accumulators is compelled to pass through the said orifice while being braked thereby, while the oil reaching the accumulators pushes back the valve 19 against the action of the spring 21 and is consequently not subjected to any braking.

The piping systems 12 and 18 are connected together by a common pipe 22 to all the control elements such as $C_1$ and $C_2$, and a change-over mechanism is provided, capable of being operated from a distance by the operator, preferably by an electric change-over switch housed in the centralized operating station. In a first position, corresponding to the operation of the valves, the change-over switch supplies on the one hand the excitation circuit 24 of an electro-valve 25, and on the other hand the excitation circuit 26 of the motor 9 of the set in services. In a second position corresponding to the maintenance of the valves, the change-over switch no longer supplies the excitation circuit of the said electro-valve and puts into operation a secondary excitation circuit 27 of the said motor 9.

The electro-valve 25 is arranged in such a manner that, in the first position of the said change-over switch, the piping system 18 and with it the accumulator devices 15–16 are cut off, the service pump 10 then delivering continuously and solely into the piping system 22 at the calibration pressure of the valve 14. In the second position of the switch shown in FIG. 1, the piping system 18 and with it the accumulator devices 15–16 are connected to the control elements, such as $C_1$ and $C_2$, by the piping 22. In this latter case, the service pump 10 then delivers in an intermittent manner simultaneously into the accumulators 15–16 and to the control elements when the excitation circuit 27 is in operation.

This secondary excitation circuit depends on two pressure contacts 28 and 29, subjected to the pressure existing in the accumulator devices, through a pipe 30, the contact 28 starting up the service motor 9 when the said pressure falls below a first limit $P_1$ (25 kg./sq. cm. for example) and the contact 29 causing the stopping of this same motor when the pressure exceeds a second limit $P_2$ (30 kg./sq. cm. for example) higher than the first. This second limit is in turn lower than the calibration pressure $P_0$ of the valve 14.

A third pressure contact 31, calibrated to a pressure $P_3$, lower than $P_1$, and connected in parallel with the two others, actuates in the operating station a visual or audible alarm signal if the pressure in the accumulators falls below the set pressure of the pressure contact 28 as a result of an operating defect of the motor-pump set in service. A hydraulic resistance 32, constituted for example by a coil of relatively small section, is interposed in the piping 30 so as to prevent undesirable oscillations of the pressure contacts 28, 29 and 31.

As far as the control elements such as $C_1$ and $C_2$ are concerned, each of these is essentially constituted by a hydraulic distributor 48, the slide-valve 49 of which is actuated by a lever 35, or other operating member. In one of the positions of the slide-valve 49 (shown for the element $C_2$), the distributor 48 on the one hand directs liquid under pressure into the upper chamber 7 of the jack of the corresponding gate-valve through a piping 36 (as indicated by the arrows in broken lines) and on the other hand causes the lower chamber 8 of the said jack to communicate with an exhaust pipe 37 through a pipe 38 (as indicated by the arrows in chain-dotted lines). In the other position of the slide-valve 49 (shown for the element $C_1$), the distributor 48 on the one hand directs liquid under pressure to the lower chamber 8 of the jack through the pipe 38 (as shown by the arrows in full lines) and on the other hand causes the upper chamber of the jack to communicate through the piping 36, with the said exhaust pipe 37, as shown by the arrows in chain-dotted lines.

There is provided in the operating station a control device constituted by a flow indicator interposed on the exhaust pipe 37 through which the liquid is exhausted from the jack, irrespective of the direction of displacement of the gate. This indicator comprises a cylinder 39, in which there can move a plunger 40 pierced with calibrated orifices 41, the plunger moving against the action of a spring 42. The rod 43 of the piston passes through the wall of the cylinder 39, so that any flow of liquid results in the emergence of this rod. The portion of the exhaust pipe 37 which is interposed between the distributor and the cylinder 39 has the reference number 137. In addition, each tank controlled by the gate-valves such as $A_1$, $A_2$, etc., is provided with a level indicator.

Finally, there can be mounted, on the conduits 38 which couple each distributor 48 to the lower chamber 8 of the corresponding jack, a maintaining valve 44 mounted in parallel with a non-return valve 45.

Since the jack is located above the gate-valve and in consequence the operating liquid acts on the head 4 of the jack by means of a surface which is larger in the direction of downward movement or closure than in the direction of upward movement or opening, because of the presence of the rod 3, it is to be feared that the gate 2 may remain jammed in the closed position.

In order to overcome this drawback, in accordance with the invention the installation is arranged so that the operating liquid acts at a lower pressure in the chamber 7 controlling the closure of the gate-valve than in the opposite chamber 8 which controls its opening. For this purpose, there is advantageously interposed in the piping system 22, 36 coupling the common source B of liquid under pressure to the chamber 7, a pressure-reducing device located close to the distributor, so that the full pressure of the source B may act in the chamber 8, whereas a reduced pressure acts in the chamber 7.

According to the form of construction of FIG. 1, a single pressure-reducing device 50 has been provided common to all the distributors 48. Each of these distributors is arranged in such manner that it can couple either the piping system 22 directly to the chamber 8 controlling the opening of the gate-valve through the pipe 38 (position shown for the control member $C_1$), or the outlet piping system 51 of the pressure-reducing device to the chamber 7 controlling the closure of the valve through the piping 36 (position shown for the control member of $C_2$). Use is preferably made of a pressure-reducing device with adjustable calibration, varied for example by means of a screw 52, this screw permitting the establishment in the piping 51, that is to say in the chamber 7 controlling the closure of the gate-valve, of a pressure substantially equal to half the maximum pressure developed by the source B and capable of acting in the opposite chamber 8 of the jack.

It can thus be seen that the force acting on the gate 2 in the direction of opening is greater than the force acting in the direction of closure, so that any possibility of jamming of the gate at its bottom position is definitely obviated.

In FIG. 1, each distributor 48 and each indicator 39 to 43 have been shown as adjacent but separate members. It is however more advantageous, as shown in vertical section in FIG. 2, on the one hand to combine each distributor and the corresponding indicator in a single unit, and on the other hand to arrange such a unit so that it can be mounted on each side of a similar unit. To this end, the distributor body 48 can be in one single piece with the cylinder 39 of the indicator. In addition, the piping systems 22 (full pressure) and 51 (reduced pressure) and the exhaust pipe 37 of FIG. 1 can be replaced, at least in part, by the conduits 22a, 51a and 37a pierced transversely in the distributor body so that they can communicate directly with the similar conduits of the juxtaposed units. Finally, the starting portions 36a and 38a of the piping systems 36 and 38 may pass downwards through the body of the distributor, so that if the distributor is fixed on a support 53, all the starting portions 36a and 38a pass out in a similar manner on the lower face of the support. In order to improve the fluidtightness of the slide-valve 49 at its extremities, it is possible to associate with the usual sealing packings 54 grooves 55 intended to collect the leakages at the end of the slide-valve, these grooves communicating by means of a passage 56 with a transverse channel 57 arranged, like the conduits 22a, 37a and 51a, so as to communicate with the similar conduits of the juxtaposed units.

In certain cases, it would appear preferable to arrange the distributors 48 so that they have an intermediate position, shown in full lines in FIG. 2, in which they cut off the two working chambers 7 and 8 of the corresponding jack and enable the gate to be stopped at any position of its travel. There can be associated with such a distributor a retractable bolt for each of the positions which it can occupy. This bolt has been omitted from FIG. 2 but is shown at 58 in FIG. 1.

By virtue of the construction of the control unit shown in FIG. 2, there is obtained a reduction in the overall size and a reduction in the cost price.

Instead of the pressure-reducing device being mounted on the upstream side of each or of all the distributors as shown in FIG. 1, it may be interposed on the downstream side of each distributor as shown in FIG. 3. To this end, there is provided a single entry 22b for the operating liquid, the latter being at the full pressure of the source B, and an individual pressure-reducer 50a is interposed on each piping system 36 terminating at the chamber 7 of the corresponding jack. Such a pressure-reducing device 50a should be connected in parallel with a non-return valve 59 which permits the liquid expelled from the chamber 7 during the opening of the gate to short-circuit the pressure-reducing device, while the liquid under pressure sent to the jack to close the gate is compelled to pass through the pressure-reducing device (as indicated by the arrows in dotted lines).

The operation of the alternative form shown in FIG. 3 is similar to that of FIG. 1, the position shown in FIG. 3 corresponding to that of the control member $C_2$ of FIG. 1. The pressure determined by the pressure-reducer 50a can in this case also be regulated, for example by means of a screw 52a.

The procedure followed may be that which has been indicated above, or alternatively another arrangement of the invention may be employed with advantage which consists in preventing jamming of gate-valves by providing on the piping systems 36 and 38 means for cutting off the jack from the remainder of the installation and for connecting it temporarily to an auxiliary source of liquid under pressure. Said means is preferably placed on the deck 60 of the ship (FIG. 1) when the invention is utilized on a petroleum tanker vessel. The means in question may be constituted by a rotary slide-valve 61, which, during normal operation (position shown at the left-hand side of FIG. 1), ensures the continuity of the piping systems 36 and 38.

In case of damage to the pumping station or to the remote control switchboard, the operator proceeds to the deck 60 and rotates the slide-valve 61 so as to bring it into the position shown at the right-hand side of FIG. 1 (valve $A_2$), for which he cuts off the sections of the piping systems 36 and 38 which lead to the control station and couples the other sections to coupling joints 62, these latter sections being shown at 36b and 38b. It should be noted that the circulation of the liquid, shown diagrammatically by the arrows in broken lines and in chain-dotted lines for the control member $C_2$ and the gate-valve $A_2$, has been illustrated as if the slide-valve 61, contrary to what has been shown, ensured the continuity of the piping systems 36 and 38. The said coupling joints 62 permit the jack to be temporarily connected to an auxiliary source of liquid under pressure, constituted for example by a portable pump AP, preferably with hand drive, capable of developing a pressure greater than (in particular substantially twice) the maximum pressure of the common source of liquid under pressure.

If the operator wishes to open the gate-valve, he couples the pressure piping of the portable pump on the piping section 38b, and he couples the other section 36b to the reservoir of this pump. He reverses these connections when it is desired to close the gate-valve. The desired operation takes place as soon as he actuates the hand pump, and he knows that the valve is open or closed completely when the pressure rises, that is to say when he feels that he has to apply a greater effort to the operating lever of the hand pump. If the latter is provided with a pressure gauge, the pressure can be checked by direct reading, which enables the operator to stop pumping as soon as the pressure rises.

A further arrangement may also be employed, as illustrated in FIGS. 4 to 6, according to which the flow indicator is constituted by a cylinder 63 having a free volume substantially equal to that of the jack, and separated by a moving member 64 into two chambers 65 and 66, respectively associated with the two chambers 7 and 8 of the jack. Also there is employed a distributor 48 having three positions, namely a neutral position (FIG. 5) in which it cuts off the two chambers 7 and 8 from the jack (by closing the pipes 36 and 38) and connects the two chambers 65 and 66 of the indicator to exhaust (through the piping systems 67 and 68), and two working positions (FIGS. 4 and 6), in which it supplies one of the chambers of the jack (chamber 7 for FIG. 4 and chamber 8 for FIG. 6), connects the other chamber of the jack to the corresponding chamber of the indicator (chamber 66 for FIG. 4 and chamber 65 for FIG. 6), and connects the other chamber of the indicator to exhaust.

To this end, instead of the five-way distributor of FIG. 1, there can be employed a distributor with seven ways, for the two incoming conduits of the driving liquid at full pressure 22 and at reduced pressure 51, for the two piping systems 36 and 38 communicating with the jack, for the two pipes 67 and 68 communicating with the indicator and for the exhaust conduit 37 which returns to the reservoir. Use can also be made of two conventional distributors with four ways, in tandem, coupled together so as to be operated simultaneously by means of the lever 35.

As shown in FIG. 4, the moving member 64 may be constituted by the head of a piston, the rod 69 of which projects from the outside of the cylinder 63, in the same way as the rod 43 of FIG. 1. As distinct from this latter figure however, the rod 69 does not have its head pierced with calibrated orifices, and is not subjected to the action of a return spring, which means that it occupies one position and one position only for any position of the gate 2 of the corresponding gate-valve. Facing this rod 69, there can therefore be mounted a scale 70, graduated for example in degrees of opening of the gate-valve.

Finally, between the chambers 65 and 66 of the indicator, it is advantageous to provide a communicating passage 71 which is normally closed and which opens automatically when the piston head 64 reaches one of the extremities of its travel. To this end, there may be arranged inside the passage 71, a valve 72 freely mounted between two seatings and fixed to a rod which frees this passage when it comes into contact with the bottom of the cylinder.

The installation of FIGS. 4 and 6 operates in the following manner. To close the gate-valve, the operator puts the lever 35 in the position shown in FIG. 4. The reduced pressure is sent into the chamber 7 of the jack through the piping system 36 (arrows in broken lines) and the oil expelled from the opposing chamber through the piping 38 is directed towards the upper chamber 66 of the indicator (arrows in chain-dotted lines). Finally, the oil is expelled from the lower chamber 65 of the indicator through the pipes 67 and 37, to the reservoir 11 (arrows in double chain-dotted lines). The displacements of the rod 69 are proportional to those of the piston head 4 of the jack and in consequence of the gate 2, which permits the position of the said gate to be read opposite the scale 70.

In order to close the gate-valve, the operator places the lever 35 in the position of FIG. 5, which cuts off the two chambers of the jack. The two chambers 65 and 66 of the indicator remain in communication with the tank through the conduits 68 and 67, but the moving system 64, 69 stops immediately because of its very low inertia. This putting into communication with the reservoir in the stopping position enables the rod 69 to be put back to zero when so required, and permits expansions due to variations of temperature.

In order to open the gate-valve, the operator sets the lever 35 to the position of FIG. 6, which sends the full pressure into the lower chamber 8 of the jack (circulation shown diagrammatically by arrows in full lines). The liquid delivered from the opposing chamber 7 passes through the distributor and is directed towards the lower chamber 65 of the indicator, the liquid contained in the upper chamber 66 of the indicator passing back into the distributor before reaching the reservoir 11 (circulation shown symbolically as in FIG. 4).

The valve 71 prevents any increase of pressure in the interior of the indicator when the unit remains open or closed for a long time, which is the case in normal use. In fact, a possible leakage, even slight, either inside the jack or in the distributor 48, between the pressure intake pipes 22 and 51 and the piping systems 36 and 38, directs the oil under pressure to the chamber 65 or 66 which is then cut off from the reservoir 11. However, as the piston 64 is at one extremity of its travel, the valve 72 is opened by pressure against the corresponding bottom, and the excess oil can be exhausted to the reservoir 11 without pressure. As soon as a movement in the reverse direction is commenced, the valve 72 closes immediately and the piston 64 is driven to the opposite extremity of its travel, upon which the valve is again opened.

Since the pressures in the chambers 65 and 66 necessary for the displacement of the moving member 64 are small, the passage 71 and its floating valve 72 can be replaced by two non-return valves connected in opposite directions between the conduits 67 and 68, these two valves being calibrated at a pressure substantially higher than that which is necessary to displace the moving member 64. At the end-of-travel of this member, the pressure in the chamber 65 or 66, which is then cut off by the distributor 48, is limited to the calibration pressure of one of the non-return valves referred to above.

By following the above procedure, there is obtained a remote control installation, the advantages of which will be sufficiently clear from the foregoing description for any further explanation to be unnecessary.

It will of course be understood, and this furthermore already results from the foregoing, that the invention is in no way limited to that of its methods of application or to those forms of construction of its various parts which have been more particularly considered; on the contrary, it includes all its alternative forms.

What we claim is:

1. A remote control installation for at least two gate-valves which comprises, in combination, a common source of liquid under pressure, a double-acting jack located in the vicinity of every gate-valve and operatively connected therewith to actuate it, respectively, each of said jacks comprising two chambers, the filling of each of said chambers with liquid under pressure operating said jack in one direction, a distributor associated with each of said jacks respectively for operating it, said distributors being grouped together, each of said distributors comprising a first inlet and a first outlet adapted to be placed in communication with each other for one position of said distributor, said first outlet being in communication with one of the chambers of the corresponding jack and a second inlet and a second outlet, to be placed in communication with each other for another position of said distributor, said second outlet being in communication with the other of the chambers of said last mentioned jack, introduction of fluid into said other of the said chambers producing closing of the valve, pipe means arranged to connect said common source of liquid under pressure with the first mentioned inlet of each of said distributors, a pressure reducing device having an inlet and an outlet, pipe means for placing said last mentioned inlet in communication with said source of liquid under pressure, and pipe means for placing said last mentioned outlet in communication with the second mentioned inlet of such of said distributors.

2. An installation as claimed in claim 1, and further comprising an auxiliary source of liquid under pressure, constituted by a portable hand-operated pump capable of developing a pressure higher than the maximum pressure of said common source, means provided on the piping systems coupling each distributor to the jack of the corresponding gate-valve for isolating said jack from the remainder of the installation and for coupling said jack temporarily to said auxiliary pump means, whereby jamming of the gate-valve diaphragms in the closed position is prevented.

3. An installation as claimed in claim 1, and further comprising flow-indicator means, means for passing the liquid expelled from the jack chamber opposite to that which receives the driving liquid under pressure through said flow-indicator, said flow-indicator comprising a cylinder having a free volume substantially equal to that of said jack and being divided by a moving indicator member into two chambers respectively associated with the two chambers of said jack, and a distributor having three positions, namely a neutral position at which it isolates the two jack chambers and puts the two chambers of said indicator to exhaust and two working positions at which it supplies one of said jack chambers, couples the other jack chamber to the corresponding chamber of said indicator and puts the other indicator chamber to exhaust.

References Cited by the Examiner

UNITED STATES PATENTS

| | | | |
|---|---|---|---|
| 2,888,029 | 5/59 | Govan et al. | 137—344 |
| 2,969,086 | 1/61 | Gstalder et al. | 137—557 |
| 3,009,474 | 11/61 | Crichton | 137—344 |

M. CARY NELSON, *Primary Examiner.*